US010122823B2

(12) United States Patent
Reeb

(10) Patent No.: US 10,122,823 B2
(45) Date of Patent: Nov. 6, 2018

(54) TRANSMISSION OF DATA IN A DISTRIBUTED DATA PROCESSING COMPUTER SYSTEM

(71) Applicant: SAP SE, Walldorf (DE)

(72) Inventor: Robin Reeb, Remchingen (DE)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 15/226,069

(22) Filed: Aug. 2, 2016

(65) Prior Publication Data
US 2017/0171347 A1 Jun. 15, 2017

(30) Foreign Application Priority Data
Dec. 15, 2015 (EP) ...................................... 15200104

(51) Int. Cl.
G06F 15/16 (2006.01)
H04L 29/08 (2006.01)
H04L 29/06 (2006.01)

(52) U.S. Cl.
CPC ............ *H04L 67/32* (2013.01); *H04L 67/104* (2013.01); *H04L 67/1097* (2013.01); *H04L 67/2814* (2013.01); *H04L 67/42* (2013.01)

(58) Field of Classification Search
CPC .......................... G06F 17/30864; H04L 67/104
See application file for complete search history.

(56) References Cited

U.S. PATENT DOCUMENTS

| 6,438,592 B1 * | 8/2002 | Killian ..................... H04L 41/22 709/203 |
| 8,352,627 B1 * | 1/2013 | Mackie ............. G06F 17/30905 370/465 |

(Continued)

FOREIGN PATENT DOCUMENTS

EP 2 400 749 12/2011

OTHER PUBLICATIONS

K. Kong and D. Ghosal, "Mitigating server-side congestion in the Internet through pseudoserving," in IEEE/ACM Transactions on Networking, vol. 7, No. 4, pp. 530-544, Aug. 1999. doi: 10.1109/90.793022.

*Primary Examiner* — Hieu T Hoang
(74) *Attorney, Agent, or Firm* — Harness, Dickey & Pierce, P.L.C.

(57) ABSTRACT

A computer-implemented method of distributed data processing comprising: establishing an end terminal-server connection between an end terminal and a server; sending a data request from the end terminal to the server via the established end terminal-server connection; terminating the established end terminal-server connection; reestablishing the end terminal-server connection; downloading from the server to the end terminal via the reestablished end terminal-server connection one of the following data items generated by the server in response to receiving the data request: an information data item generated by the server according to the data request or a connectivity data item comprising a connectivity information for establishing a connection to another end terminal, the information data item having a bigger data volume than the connectivity data item; terminating the reestablished end terminal-server connection; in response to downloading from the server of the connectivity data item establishing an end terminal-end terminal connection between the end terminal and the another end terminal using the connectivity information comprised in the connectivity data item; processing the data request, the processing comprising: sending the data request from the end terminal to the another end terminal via the established end terminal-end terminal connection, the end terminal causing the another end terminal to generate an information data item according to the data request via the established end terminal-end terminal connection, and downloading from the another end terminal to the end terminal the information (Continued)

data item generated by the another end terminal via the established end terminal-end terminal connection; and terminating the established end terminal-end terminal connection.

16 Claims, 7 Drawing Sheets

(56) References Cited

U.S. PATENT DOCUMENTS

| | | | |
|---|---|---|---|
| 2003/0050966 A1* | 3/2003 | Dutta | H04L 29/06 709/203 |
| 2003/0120734 A1* | 6/2003 | Kagan | G06F 17/30864 709/206 |
| 2006/0277268 A1 | 12/2006 | Everhart | |
| 2007/0022174 A1* | 1/2007 | Issa | H04L 67/104 709/217 |
| 2014/0280306 A1 | 9/2014 | Juillard | |

* cited by examiner

TRANSMISSION OF DATA IN A DISTRIBUTED DATA PROCESSING COMPUTER SYSTEM

TECHNICAL FIELD

The present disclosure relates to transmission of data in a distributed data processing system. More particularly, the present disclosure relates to optimization of data traffic between components of the distributed data processing computer system. The present invention is attributed to IPC class H04L "transmission of digital information".

BACKGROUND

Data processing is a routine of every computer in the world. Modern computers are connected by networks and perform processing of data items in structures like for instance computer clouds. The data items can be related and/or the processing of the data items can be related. Optimal performance of this configuration depends on many factors such as computing power of each computer, structuring and sequence of data processing, organization of data transmission between the computers, etc. Non-optimal selection of these parameters and the like can compromise the performance of the computer cloud. For instance, when one computer in the computer cloud has much higher performance than the other computers in the computer cloud it can perform the major load of data processing in the computer cloud. However sharing of the results generated by this computer with the other computers can demand substantial network resources for communicating the generated results to the other computers in the computer cloud. The problem of resource allocation in the computer cloud gets more complicated when a synergetic performance of computers and other resources in the computer cloud having substantially heterogeneous properties is required. Specific features of networks, computer architectures of the computers, specific aspects of data processing, etc. have to be taken into account for optimal performance of the computer cloud. In addition various aspects of data protection have to be taken into account.

SUMMARY

Computer cloud is, as understood here, a shared pool of computer resources connected by computer networks. The shared pool of computer resources comprises servers, computer implemented services, sub-networks, and data storages.

The information data item is, as understood herein, a data item encompassing machine parsable data, such as data which is processed, organized, structured, or presented in a given context data. For instance, it can be a media file, a data file, a text file, or fragment thereof.

The connectivity data item is, as understood herein, a data item encompassing a machine parsable information enabling identification of a computer system and establishing a connection to it. For instance, it can be an internet protocol (IP) address, media access control (MAC) address, internet link, etc. In addition, it can comprise a specification of a computer network protocol for establishing the connection to the computer system.

A computer-implemented method for a distributed data processing, a computer readable medium having stored thereon a computer executable code for execution of the computer-implemented method, an end terminal, and a server are disclosed herein. As it will be clearly seen from the description hereon, the computer implemented method exploiting the advantageous features of the end terminals and the server provides for an optimal balance between loading of resources of the and terminals and the server on one hand and computer networks providing data transmission between the end terminals themselves and between the and terminals and the server on the other hand.

It is an objective of embodiments of the invention to provide for an end terminal providing optimal distributed data processing, a server providing the same, and a computer-implemented method for a distributed data processing using an end terminal with optimized data transmission between the server and the end terminals. Advantageous embodiments are described in the dependent claims.

According to one embodiment, the present invention relates to a computer-implemented method of distributed data processing comprising: establishing an end terminal-server connection between an end terminal and a server; sending a data request from the end terminal to the server via the end terminal-server connection; in response to receiving the data request the server generating a data item, wherein the data item is a connectivity data item when an information data item can be generated on another end terminal using one or more information data items stored on a local data storage of the another end terminal according to the data request otherwise the data item is an information data item generated by the server according to the data request, the connectivity data item comprising a connectivity information for establishing a connection to the another end terminal, the information data item having a bigger data volume than the connectivity data item; downloading the data item from the server to the end terminal via the end terminal-server connection terminating the end terminal-server connection; in response to downloading from the server of the connectivity data item establishing an end terminal-end terminal connection between the end terminal and the another end terminal using the connectivity information comprised in the connectivity data item; processing the data request, the processing comprising: sending the data request from the end terminal to the another end terminal via the end terminal-end terminal connection, the end terminal causing the another end terminal to generate an information data item according to the data request via the end terminal-end terminal connection, and downloading from the another end terminal to the end terminal the information data item generated by the another end terminal via the end terminal-end terminal connection; and terminating the end terminal-end terminal connection.

This embodiment can be advantageous because it can reduce the workload of the server and/or network traffic between the end terminals and the server, by transferring of a portion of the workload from the server to the end terminals.

According to another embodiment, the present invention relates to a computer readable medium having stored thereon a computer executable code for execution by processing units controlling a server and end terminals, wherein execution of the instructions of the executable code causes the processing units to execute a computer-implemented method of the aforementioned embodiment.

According to another embodiment, the present invention relates to server comprising a processing unit, a server data storage, and a memory, the memory comprising a computer executable code, the computer executable code when executed by the processing unit causing the server to perform the following: storing on the server data storage policies of storing of information data items on local data storages of a plurality of end terminals, connectivity information for establishing connection to each of the end terminals of the plurality of end terminals, descriptions of information data items stored on their local data storages; establishing an end terminal-server connection between an end terminal and the server; receiving a data request from the end terminal to the server via the end terminal-server connection; querying the server data storage in order to identify whether one or more information data items are available on the local data storage of one of the end terminals of the plurality of end terminals according to their respective storage policies for generation of an information data item according to the data request when the data request is received from the end terminal for the first time; generating a data item being a connectivity data item comprising the connectivity information for establishing an end terminal-end terminal connection to the one of the end terminals when the one or more information data items are available on the local data storage of one of the end terminals according to their respective storage policies for generation of an information data item according to the data request and when the data request is received from the end terminal for the first time, otherwise generating a data item being the information data item according to the data request, wherein the information data item has a bigger data volume than the connectivity data item; uploading from the server to the end terminal via end terminal-server connection the generated data items and terminating the end terminal-server connection.

This embodiment can be advantageous because it can improve a web browsing process. As usual the web browsing process has to be developed such that failures of different components have no or minimum possible effect on the web browsing process. Since at least a portion of data can be received from another end terminal (e.g. a tablet, a smartphone, etc.) its generation and sending might be prone to various failures because it is very difficult to implement a tablet having the same reliability of performance as the server which is dedicated for data generation and its distribution to many end terminals. The data requests which are sent for the second time to the server as a consequence of failures of the end terminals which had to generate the requested information data items are processed exclusively by the server. As a result thereof the lime needed for processing of the repetitively sent data requests is minimized.

According to another embodiment, the present invention relates to an end terminal comprising a processing unit and a memory, the memory comprising a computer executable code, the computer executable code when executed by the processing unit causing the end terminal to perform the following: establishing an end terminal-server connection between the end terminal and a server; sending a data request from the end terminal to the server via the end terminal-server connection downloading from the server to the end terminal via the another end terminal-server connection a data items a connectivity data item generated by the server in response to receiving the data request when an information data item can be generated on another end terminal using one or more information data items stored on a local data storage of the another end terminal according to the data request, otherwise downloading from the server to the end terminal via the end terminal-server connection a data item being an information data item generated by the server according to the data request, the connectivity data item comprising a connectivity information for establishing a connection to another end terminal, the information data item having a bigger data volume than the connectivity data item; in response to downloading from the server of the connectivity data item establishing an end terminal-end terminal connection between the end terminal and the another end terminal using the connectivity information comprised in the connectivity data item; and processing the data request, the processing comprising: sending the data request from the end terminal to the another end terminal via the established end terminal-end terminal connection, causing the another end terminal to generate an information data item according to the data request via the established end terminal-end terminal connection, and downloading from the another end terminal to the end terminal the information data item generated by the another end terminal via the established end terminal-end terminal connection, and terminating the end terminal-end terminal connection.

This embodiment can be advantageous because it can reduce the workload of the server and/or network traffic between the end terminals and the server, by transferring of a portion of the workload from the server to the end terminals.

DETAILED DESCRIPTION

Figure 1:
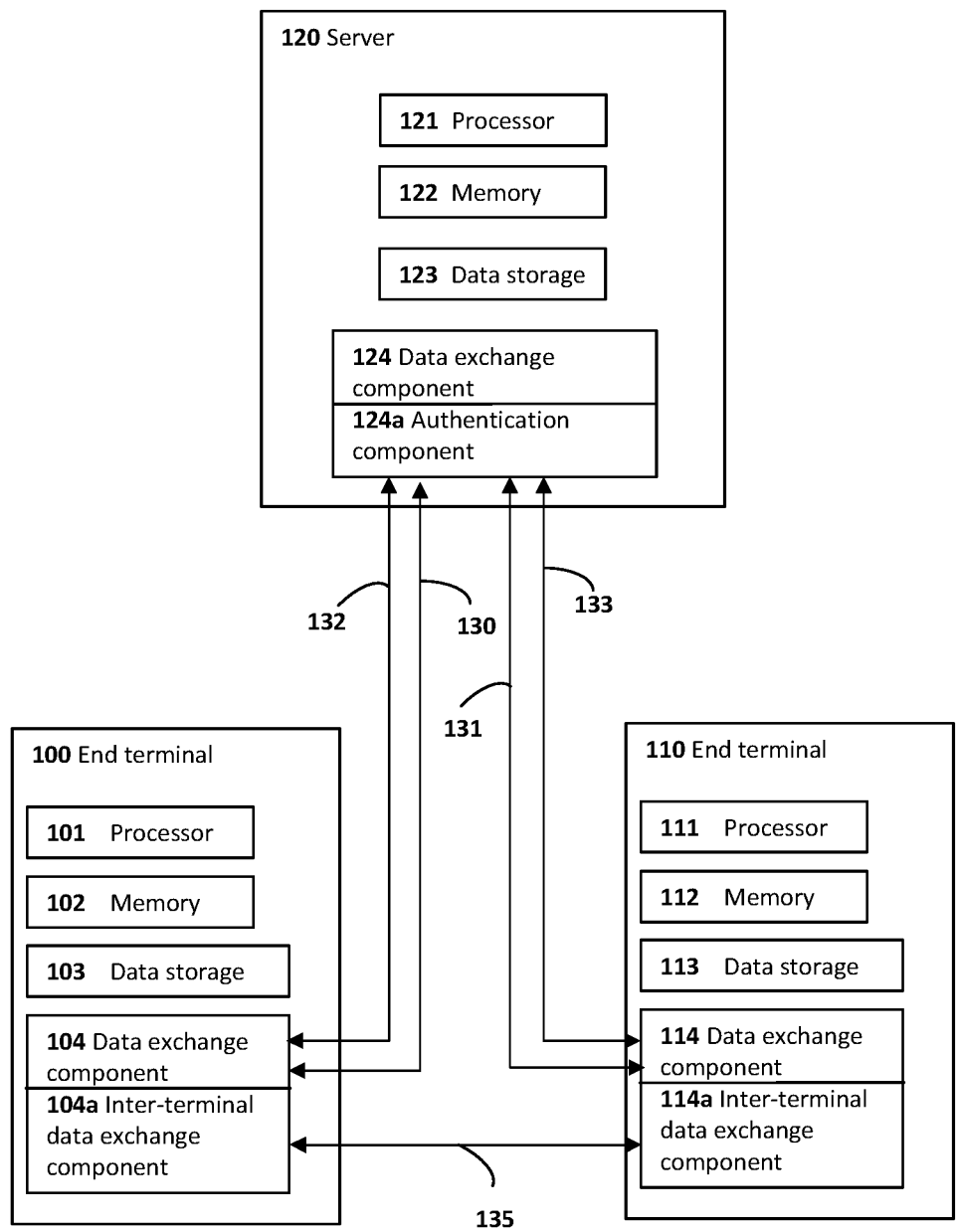
FIG. 1 is a block diagram illustrating computer systems.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

According to another embodiment, the computer implemented method comprises: terminating the end terminal-server connection before the downloading from the server to the end terminal via the end terminal-server connection of the data item when a duration of the generation of the data item by the server exceeds a first predefined time interval; and reestablishing the end terminal-server connection before the downloading from the server to the end terminal via the end terminal-server connection of the data item when the end terminal-server connection is terminated before the downloading from the server to the end terminal via the end terminal-server connection of the data item.

This embodiment can be advantageous, because it can provide for further reduction of the end terminal-server network traffic.

According to another embodiment, the end terminal-server connection is a client-server connection and the end terminal-end terminal is a peer-to-peer connection.

This embodiment can be advantageous, because it can provide for an effective utilization of resources. In contrast to end terminal-server connection (client-server connection) being "one to many" type, the peer to peer connection between the end terminals is "one to one" connection type. The end terminals can be simple handheld computers such as smartphones or tablets. Providing their performance at the reliability level comparable with the reliability of the server can be quite problematic. More over installing a formidable server application on a handheld device might compromise its performance because its hardware resources are much more limited in comparison with the server. The peer to peer connection between the end terminals is a one to one connection, which can demand much less resources in comparison with the end terminal-server connection.

According to another embodiment, the computer implemented method comprises: in response to downloading either from the server or from the another end terminal of the information data item generating a further data request by processing a content of the downloaded information data item on the end terminal; establishing another end terminal-server connection between the end terminal and the server; sending the further data request from the end terminal to the server via the another end terminal-server connection; in response to receiving the further data request the server generating another data item, wherein the another data item is another connectivity data item when the another information data item can be generated on another end terminal using one or more information data items stored on its local data storage according to the data request otherwise the another data item is an information data item generated by the server according to the further data request, the another connectivity data item comprising a connectivity information for establishing a connection to the another end terminal which local storage stores the one or more information data items using which the another information data item can be generated according to the further data request, the another information data item having a bigger data volume than the another connectivity data item; downloading the another data item from the server to the end terminal via the another end terminal-server connection; terminating the reestablished another end terminal-server connection.

This embodiment can be advantageous, because it can provide for an iterative process of requesting information data items, wherein the next data request is based on the information data item downloaded from either the server or the another end terminal. In this iterative process the server and the end terminals can be a source of further information data items.

According to another embodiment, the computer implemented method comprises further the following when the establishing of the end terminal-end terminal connection or the processing of the data request fail: establishing yet another end terminal-server connection between the end terminal and the server, repeating the sending of the data request from the end terminal to the server, the server generating the information data item according to the data request which is repetitively sent, downloading from the server to the end terminal via the yet another end terminal-server connection the information data item generated by the server according to the data request which is repetitively sent, and terminating the yet another reestablished end terminal-server connection.

This embodiment can be advantageous because it can provide the guaranteed generation of the information data item in the server, when the first attempt of the generation of the data item on the end terminal failed. As usual the web browsing process has to be developed such that failures of different components have no or minimum possible effect on the web browsing process. Since at least a portion of data can be received from another end terminal (e.g. a tablet, a smartphone, etc.) its generation and sending might be prone to various failures because it is very difficult to implement a tablet having the same reliability of performance as the server which is dedicated for data generation and its distribution to many end terminals. The data requests which are sent for the second time to the server as a consequence of failures of the end terminals which had to generate the requested information data items are processed by the server with higher priority than the data requests which are sent to the server for the first time. As a result thereof the time lost for an unsuccessful attempt to get the information data item from the end terminal is compensated by the reduced delay for processing by server of the same data request which is sent to the server for the second time.

According to another embodiment, the server is configured to process data requests, which are repetitively sent to the server as a consequence of failure to execute establishing of respective end terminal-end terminal connections or as a consequence of failure to execute processing said data requests, with higher priority than data requests, which are sent to the server for the first time.

This embodiment can be advantageous because it can provide acceleration of the generation of the data requests which generation was delayed due to failure of their generation on the end terminals.

According to another embodiment, the method step of the end terminal causing the another end terminal to generate an information data item according to the data request via the established end terminal-end terminal connection comprises: sending a maximum time interval for the generation of the data item according to the data request to the another end terminal; reconfiguring the another end terminal in order to make it operable for the generation of the data item according to the data request within the maximum time interval; and generating on the another end terminal the information data item according the data request using one or more information data items stored on a local data storage of the another end terminal.

This embodiment can be advantageous because it can ensure that sufficient computer resources are allocated on the end terminal for the generation of the information data item in time.

According to another embodiment, each of the one or more information data items stored on the local data storage of the other terminal is either generated on the another terminal or downloaded from the server or any other end terminal.

This embodiment can be advantageous, because it can enable generation of new information data items not only on the server but on the end terminals.

According to another embodiment, the establishing of said end terminal-server connections is initiated by the end terminal and the reestablishing of said end terminal-server connections is initiated by the server, wherein the establishing and the reestablishing of the end terminal-server connection is performed using an asynchronous request-response client-server computer network protocol.

This embodiment can be advantageous because it can provide for optimum communication between the end terminals and the server.

According to another embodiment, the establishing of the end terminal-end terminal connection is performed using a computer network protocol supporting generation of one or more sockets for the downloading from the another end terminal to the end terminal of the information data item generated on the another end terminal, wherein the downloading from the another end terminal to the end terminal of the information data item generated on the another end terminal is performed using sockets generated on the end terminal and the another end terminal.

This embodiment can be advantageous because it can provide for optimum communication between the end terminals.

According to another embodiment, the computer-implemented method further comprises: generating on the end terminal an information data item using one or more information data items stored on a local data storage of the end terminal, wherein each of the one or more information data items stored on the local data storage of the end terminal is either generated on the end terminal or downloaded from the server or any of the end terminals; storing the information data item generated on the end terminal on its local data storage; and sending from the end terminal to the server a storage policy of the storing of the information data item on the local data storage of the end terminal, a description of the information data item generated on the end terminal, and a connectivity information for establishing a connection to the end terminal.

This embodiment can be advantageous because it can provide for generation of information enabling effective management of the information data items stored on the local data storages of the end terminals.

According to another embodiment, the sending from the end terminal to the server of the storage policy of the storing of the information data item on the local data storage of the end terminal, the description of the information data item generated on the end terminal, and the connectivity information for establishing the connection to the end terminal is executed using an additional end terminal-server connection between the server and the end terminal, wherein the additional end terminal-server connection is established using one of the following protocols: an instant messaging computer network protocol, an encrypted instant messaging computer network protocol, and cryptographic computer network protocol.

This embodiment can provide for advanced data protection because the information related to the information data items stored on the local data storages of the end terminals is transferred to the server via the additional end terminal-server connection which can have advanced encryption and/or advanced speed of data transfer.

According to another embodiment the connectivity information comprised in the connectivity information data item is encrypted by an encryption key. The computer-implemented method comprises sending the encryption key to the end terminal via the additional end terminal-server connection. The establishing of the end terminal-end terminal connection between the end terminal and the another end terminal using the connectivity information comprised in the connectivity data item comprises decrypting of the encrypted connectivity information comprised in the connectivity data item using the encryption key received on the end terminal from the server via the additional end terminal-server connection.

This embodiment can be advantageous because it can provide additional data protection of the connectivity information by encrypting with encryption key and sending the encryption key and the encrypted connectivity information via different connections between the end terminal and the server.

According to another embodiment, the computer-implemented method further comprises: receiving from the end terminal on the server the storage policy of the storing of the information data item on the local data storage of the end terminal, the description of the information data item generated on the end terminal, and the connectivity information for establishing the connection to the end terminal; storing on a server data storage the received storage policy, the received description of the information data item, and the received connectivity information, wherein the sever data storage stores storage policies of storing of information data items on local data storages of a plurality of said end terminals, connectivity information for establishing connection to each of the end terminals of the plurality of said end terminals, descriptions of the information data items stored on the local data storages of the plurality of said end terminals; in case when one of the stored storage policies indicates that the information data item is no longer available on the local data storage of one of end terminals of the plurality of said terminals or its description is stored on the server data storage longer than a predefined time interval deleting from the server data storage the one of the storage policies and the respective description of the information data item; in response to receiving another data request on the server from the end terminal querying the server data storage in order to identify whether one or more information data items are available on a local data storage of one of the end terminals of the plurality of said end terminals for generation of yet another information data item according to the another data request; when a condition comprising that the one or more information data items are available on the local data storage of the one of the end terminals for the generation of the yet another information data item according to the another data request is fulfilled executing the following: generating on the server yet another connectivity data item comprising a connectivity information for establishing a connection to the one of the end terminals, and providing on the server for downloading by the end terminal the yet another generated connectivity data item, otherwise: generating on the server the yet another information data item according to the another data request, and providing the yet another generated information data item on the server for downloading by the end terminal; and in response to receiving the data request on the server from the end terminal, which is repetitively sent to the server by the end terminal executing the following: generating on the server the information data item according to the data request, providing the generated information data item on the server for downloading by the end terminal, and deleting the following information from the sever storage: the description of the one or more information data items stored on the local data storage of the another end terminal and the storage policies of the one or more information data items stored on the local data storage of another end terminal.

This embodiment can be advantageous because it can provide for effective identification of the end terminal for the generation of the information data item on a basis of information stored on the server, which is related to the information data items stored on the end terminals.

In another embodiment the condition comprises that the one of the end terminals is in an on-line state.

This embodiment can be advantageous because it can prevent unsuccessful attempt to generate the information data item on the end terminal which is in off-line state.

In another embodiment, the computer implemented method further comprises: after the downloading of the information data item on the end terminal either from the server or from the anther end terminal sending the following information from the end terminal to the server via the additional end terminal-server connection when the information data item is downloaded correctly and stored on the local data storage of the end terminal: a storage policy of the storing of the downloaded information data item on the local data storage of the end terminal, a description of the downloaded information data item, and a connectivity information for establishing a connection to the end terminal.

This embodiment can be advantageous, because it can provide for a timely update of the information stored on the server data storage, which is related to the information data items stored on the local data storages of the end terminals.

In another embodiment, the computer implemented method further comprises deleting from the server data storage the information data item and its storage policy when they are stored on the sever data storage longer than a third predetermined time interval.

This embodiment can be advantageous, because it limits access to the information data items only which were recently downloaded to the end terminals on generated on them. This feature can be beneficial because it can exclude old versions of information data items stored on the end terminals from distribution of information.

FIG. 1 illustrates a server 120 and end terminals 100 and 110. The server comprises a processor 121 controlling the server, a memory 122 storing computer executable instructions executed by the processor, a server data storage 123, a data exchange component 124 for communicating with the end terminals, the data exchange component 124 can comprise or operate in conjunction with an authentication component 124a. The authentication component is configured to validate authentication information provided by computer systems when requesting data from the server. The server data storage 123 can be configured for storing information data items and/or information related to information data items stored on end terminals.

The end terminals can be but are not limited to tablets, smartphones, laptops, personal computers, and servers.

The server can be integrated in a computer cloud. The end terminals can be integrated in the computer cloud as well.

An example end terminal 100 comprises a processor 101 controlling the end terminal, memory 102 storing computer executable instructions executed by the processor, a local data storage 103 for storing information data items, a data exchange component 104 for communicating with the server, and an inter-terminal data exchange component 104a for communicating with the other end terminals. The inter-terminal data exchange component can be configured to operate as a separate unit or in conjunction with the data exchange component 104.

Another end terminal 110 comprises a processor 111 controlling the end terminal, at memory 112 storing computer executable instructions executed by the processor, a data storage 113 for storing information data items, a data exchange component 114 for communicating with the server, and an inter-terminal data exchange component 114a for communicating with the other end terminals. The inter-terminal data exchange component can be configured to operate as a separate unit or in conjunction with the data exchange component 114.

The data exchange components 104 and 114 of the end terminals 100 and 110 communicate with the data exchange component 124 of the server 120 via one or connections 130, 132; 131, 133 provided by one or more computer networks. At least one of the connections 130-133 can be a client-server connection. Each connection can be established using a respective computer network protocol. The inter-terminal data exchange components 104a and 114a of the end terminals communicate with each other via another connection 135 provided by one or more computer networks. The connection 135 can be a peer-to-peer connection. The connection 135 is established using another respective computer network protocol. Each of the connections can be provided via a respective set of computer networks. For instance the connection 135 can be provided by one or more digital cellular telecommunication networks, while one or more of the other connections between end terminals and the server can be provided by one or more telecommunication networks based on wireless and/or wired technologies. Using one dedicated unit 104, 114a for communication between the server 102 and the end terminal 100, 110 and another dedicated unit 114a, 104a for communication between the end terminals can be advantageous because such architecture can reduce vulnerabilities of the end terminal by assigning specific application functionalities such as communication between the end terminal and the server and communication between the end terminals.

Figure 2:
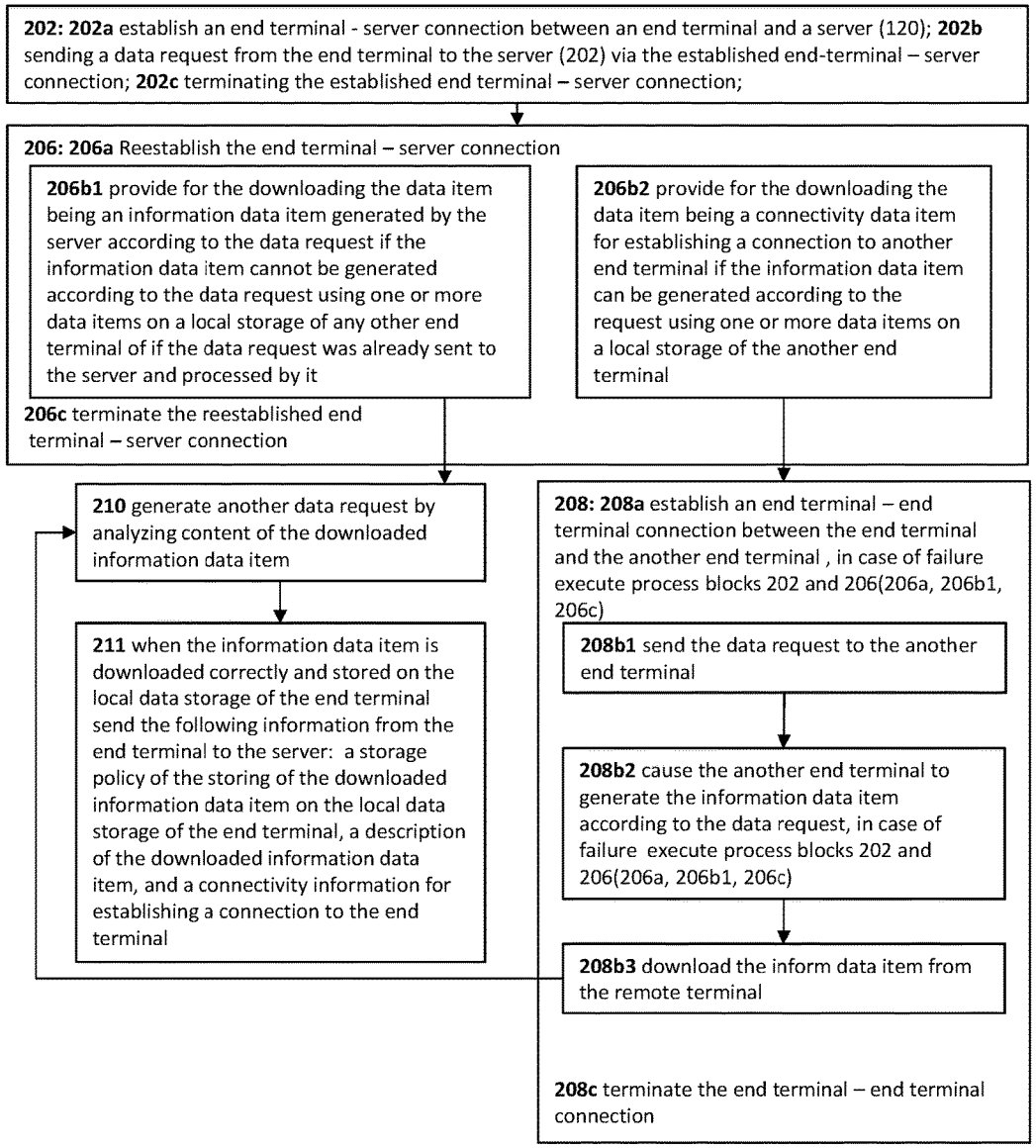
FIG. 2 is a block diagram of a process.

FIG. 2 illustrates a computer-implemented method for distributed data processing using an end terminal. It can begin with optional process blocks wherein the end terminal 100 performs registration on the server 120 and an account for the end terminal is generated on the server. The generation of the account can comprise generation of authentication information for the end terminal. The authentication information can be validated by the server when receiving data requests from the end terminal. The serve can be configured to process the data request received from the end terminal only when the authentication provided by the end terminal is successfully validated.

Process block 202 can be a starting process block of the method or it can be executed after the aforementioned optional process blocks. In process block 202 comprises the following steps: establishing an end terminal-server connection 130 between an end terminal 100 and a server 120 202a; sending a data request from the end terminal to the server via the established end terminal-server connection 130 202b; and terminating the established end terminal-server connection 130 202c. The data request can comprise authentication information of the end terminal.

If the authentication information is sent the server and it is configured to validate the authentication information, the data request can be processed only on condition that the authentication information is successfully validated. In case when the validation is not successful the server cancels processing the data request and sends an error message to the end terminal 100.

Process block 206 is executed after process block 202. In process block 206 the server 120 reestablishes the end terminal-server connection 130 (process step 206a). Afterwards in process step 206b of process block 206 one of the following data items generated by the server in response to receiving the data request is downloaded from the server 120 to the end terminal 100: an information data item generated by the server according to the data request (process step 206b1 comprised in process block 206) or a connectivity data item comprising a connectivity information for establishing a connection to another and 110 terminal (process step 206b2 comprised in process block 206). The information data item can have a bigger data volume than the connectivity data item.

Process step 206b1 is executed if the information data item cannot be generated according to the data request using one or more information data items sorted on a local data storage of any of the end terminals or if the same data request was already sent to the server before from the same end terminal. Process step 206b2 is executed if the information data item can be generated according to the data request using one or more data items on a local data storage of one of the end terminals except the end terminal from which the data request was sent and when the data request was sent from the end terminal to the server for the first time. As it will be shown further in the description the another end terminal is identified in a course of a process wherein data stored on a server data storage regarding information data items stored on the local data storages of the end terminals is queried in order to find one of the end terminals which local data storage comprises the one or more information data items required for the generation of the information data item according to the data request. When the query is successful the one of the end terminals delivered by it is called the another end terminal above and further in the text.

Generation of the information data item using one or more information data items can be executed in various ways. For instance, the information data item can be generated by combining fragments of the one of more information data items, or the information data item can be generated by combining the one or more information data items. In addition the information data items can generated by combining at least one information data item with at least one fragment of another information data item.

The establishing and reestablishing of the end terminal-server connections between the end terminals (e.g. end terminals 100, 110) and the server 120 can be performed using an asynchronous request-response client-server computer network protocol. The establishing of said end terminal-server connections 130 is initiated by the respective end terminals and the reestablishing of said end terminal-server connections 130 is initiated by the server. The request-response client-server computer interwork protocol can be for instance: Hyper Text Transfer Protocol or Secure Hyper Text Transfer Protocol.

In order to minimize a load of computer networks providing the end terminal-server connections the end terminal-server connection is terminated after sending the data request and reestablished when the data item generated by the server is sent in response to the data request.

In case when the generation of the data item by the server in response to receiving the data request is less than a predefined time interval (e.g. the predefined interval is selected short enough in order to avoid network overloading) the same end terminal-server connection between the end terminal and the sever can be maintained for sending the data request to the server and getting the respective data item from the server in response. In other words, execution of process blocks 206a and 202c is optional. They can be executed when generation of the data item on the server exceeds a predetermined time interval. When process blocks 206a and 202c are not executed then the data item generated by the server is downloaded via the established in process block 202a end terminal-server connection.

The aforementioned information data items can be text files, data files, audio files, video files, binary large objects, etc. The data content of the information data items can be unstructured or can have a structured format (e.g. jpeg, mp3, mp4, txt).

Process block 208 is executed after process block 206b2. In process step 208a of process block 208 an end terminal-end terminal connection 135 between the end terminal 100 and the another end terminal 110 is established using the connectivity information comprised in the connectivity data item. If the establishing of the end terminal-end terminal connection fails than the end terminal sends the same data request to the server for the second time, i.e. execution of the process block 202 is repeated. Since this data request is sent to the server for the second time, process step 206b1 in process block 206 is executed afterwards.

The processing of the data request in process block 208 further comprises processing of the data request. The processing of the data request comprises process steps blocks 208b1, 208b2, and 208b3. First process step 208b1 is executed, wherein the data request is sent from the end terminal 100 to the another end terminal 110 via the established end terminal-end terminal connection, wherein the data request sent to the another end terminal was previously sent to the server in process block 202. Process step 208b2 is executed after process step block 208b1. In process block 208b2 the end terminal 100 causes the another end terminal 110 to generate an information data item according to the data request via the established end terminal-end terminal connection. Process step 208b3 is executed after process step 208b2. In process step 208b3 the information data item generated by the another end terminal 110 is downloaded from the another end terminal 110 to the end terminal 100 via the established end terminal-end terminal connection. Process steps 208b1-3 are executed using the established in process block 208a end terminal-end terminal connection 135 without interrupting it. Failure to execute any of the process steps 208b1-3 causes execution of process block 202, wherein the data request previously sent to the server 120 is sent to the server 120 for the second time. As a result thereof process step 206b1 is executed in process block 206 afterwards.

The server 120 can be configured to process data requests, which are repetitively sent to the server as a consequence of failure to execute establishing of respective end terminal-end terminal connections (process step 208a) or as a consequence of failure to execute processing said data requests (process steps 208b1-3), with higher priority than data requests, which are sent to the server for the first time.

The establishing of the end terminal-end terminal connection between the end terminals (e.g. the end terminal 100 and the another end terminal 110) can be performed using an asynchronous encrypted computer network protocol, that is capable of initiating the connection between at least two end terminals asynchronously and preferably provides low network jitter, packet loss, latency, etc. Preferably, this protocol has to support generation of one or more sockets for the downloading from the another end terminal 110 to the end terminal 100 of the information data item generated on the another end terminal. The following example protocols can be used for the generation of one or more sockets in the course of the established connection between the end terminal and the another end terminal: Web Sockets and Web Real-Time Communication Data Channel. Inter-terminal data exchange component can be configured to as separate unit exclusively configured for maintaining socket connections in order to improve performance of the end terminals and increase data protection.

Optional process blocks 210 and 211 can be executed either after process block 206*b*1 or after process block 208*c*. In process block 210 a further data request is generated on the end terminal 100 by analyzing a content of downloaded information data item on the end terminal. Alternatively or in addition, the generation of the further data request can be performed by analyzing contents of one or more previously downloaded on the end terminal 100 information data items on the end terminal. After the generation of the further data request, it can be processed by repeating execution of process block 202 and further subsequent process blocks according to the flow chart diagram of FIG. 2.

In process block 211 the correctness of the downloading of the information data item can be checked. When the information data item is downloaded correctly and stored on the local data storage of the end terminal the following information is sent to the server: a storage policy of the storing of the downloaded information data item on the local data storage of the end terminal, a description of the downloaded information data item, and a connectivity information for establishing a connection to the end terminal.

The storage policy can specify the following: time interval in which the information data item stored on the local data storage of the end terminal is available for the generation of other information data item, and/or whether the end terminal on which local data storage the information data item supports only providing the information data item for downloading or further processing of the information data item is possible, such as extracting portions from the information data item and/or merging of the information data items and/or their fragments.

Process block 211 can be illustrated on the following example. The data item can be a multipage data file. For some applications, the process of downloading of entire multipage data file might not be necessary. For instance after the downloading of the first pages of the multipage data file it may considered that the first pages already indicate that entire document is not needed, e.g. the information contained in the first pages is already sufficient and the process of downloading is aborted, or when content of the first pages indicates that the multipage document is irrelevant and there is no need to continue the downloading. This might be the case when the multipage document is an electronic book having several chapters each having its own download price. That is why it is important to check the correctness/completeness of the download process when the multipage data file is to be downloaded from the end terminal or to be used for generation of other information data items for other end terminal. Sending to the server the storage policy of the downloaded multipage data file can be required, when the downloaded item is stored on the local data storage of the end terminal (or available for generation of other information data items for other end terminals) only for a predefined interval of time and/or only for a predefined number of times. The description of the information data item stored on the local data storage has to be sent to the server when the stored information data item differs from the downloaded one. For instance, when only a portion (e.g. a chapter) of the multipage data file (e.g. a book) is stored on the local data storage of the end terminal. Moreover, the information data item stored on the local data storage of the end terminal can be generated using one or more other information data items stored on its local data storage in response to receiving a data request or in a process of local processing on the end terminal of one or more information data items on its local data storage. In this case, a description of the generated information data item can be sent to the server as well. The connectivity information is needed for establishing connection to the end terminal when one or more information data items stored on its local data storage are required for generation of an information data item. The connectivity information can comprise internet address of the end terminal (e.g. internet protocol address (IP)), authentication data for establishing connection to the end terminal, encryption keys for encryption of information, etc. When the server receives this information, it can generate data items in response to the received data request in accordance with this information in order to provide correct generation of the information data items on the end terminals.

Figure 3:
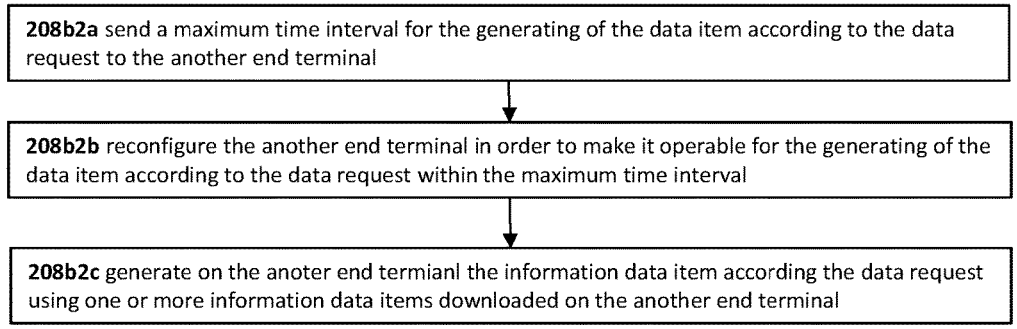
FIG. 3 is a block diagram of a process.

A sequence of process steps 208*b*2*a*, 208*b*2*b*, and 208*b*2*c* describe example implementation of process step 208*b*2 in greater detail (FIG. 3). In process step 208*b*2*a* a maximum time interval for the generation of the data item according to the data request is sent to the another end terminal. This parameter can be important because the another end terminal may have performance which is much less than a performance of the server. Thus, it might be important to specify maximum allowable time interval for the generation of the information data item. Process step 208*b*2*b* is executed after process step 208*b*2*b*, wherein the another end terminal is reconfigured in order to make it operable for the generation of the data item according to the data request within the maximum time interval. For instance, a processor load and/or a memory volume can be reserved for the generation of the information data item within the maximum time interval. Process block 208*b*2*c* is executed after process block 208*b*2*b*, wherein the information data item is generated according the data request using one or more information data items stored on a local data storage 113 of the another end terminal 110.

Figure 4:
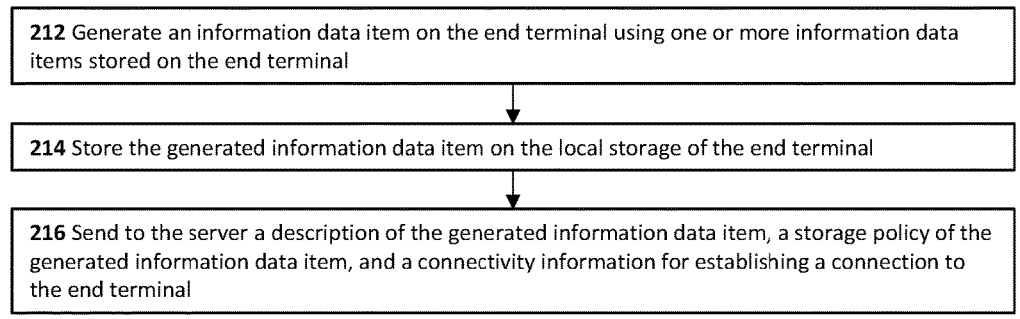
FIG. 4 is a block diagram of a process.

FIG. 4 depicts a sequence of process blocks 212, 214, and 216, which can be executed on an end terminal in response to receiving a data request or in a course of processing of information data items stored on its local data storage by an internal process executed on the end terminal. For instance, the internal process executed on the end terminal can compact storage space used by the information data items on the local data storage of the end terminal by extracting fragments from the information data items and storing them instead of the parent information data items. In process block 212 an information data item is generated on the end terminal using one or more information data items stored on a local data storage of the end terminal, wherein each of the one or more information data items stored on the local data storage of the end terminal is either generated on the end terminal or downloaded from the server or any of the end terminals. Process block 214 is executed after process block 212. In process block 214 the data item generated on the end terminal is stored on its local data storage. Process block 216 is executed after process block 214. In process block 216 the following information is sent from the end terminal to the server: a storage policy of the storing of the information data item on the local data storage of the end terminal, a description of the information data item generated on the end terminal, and a connectivity information for establishing a connection to the end terminal.

This information can be sent via connection such as end terminal-server connections 130 or 131 described above or via additional end terminal-server connection 132 or 133. The latter can be established via one or more computer networks using one of the following computer network protocols: an instant messaging computer network protocol (e.g. Extensible Messaging and Presence Protocol, TextSecure), an encrypted instant messaging computer network protocol (e.g. Off-the-Record Messaging), or a cryptographic network protocol (e.g. Internet Key Exchange, Kerberos, or Point to Point Protocol, Transport Layer Security). Utilization of different connections 135, 132, 130 can be advantageous, because each of them can be performed via dedicated ports specified in the network protocols. They may have different encryptions. For instance information sent via connection used for sending the data requests and receiving data items can have low level of data protection, because the data information data items can have very big data volumes (e.g. in gigabytes, or terabytes). Providing high level of data protection for big volumes of data transmitted via computer networks using end terminal-server connection 130 or 131 may demand a lot of computer resources. On contrary, the information send via additional end terminal-server connections 132 and 133 can have substantially lower data volumes for transmission (i.e. a connectivity information, description of an information data item, a storage policy). This info can require substantially higher data protection, because when intercepted by hackers it can enable unauthorized access to the end terminal and/or disclose private information regarding information data items stored on the local data storage of the end terminal. Moreover, when this information is delivered "instantly" (i.e. very fast), as it is customary for the instant messaging protocols, it improves performance of the sever so that it can outsource generation of a bigger number of information data items to end terminals in a correct way.

Figure 5:
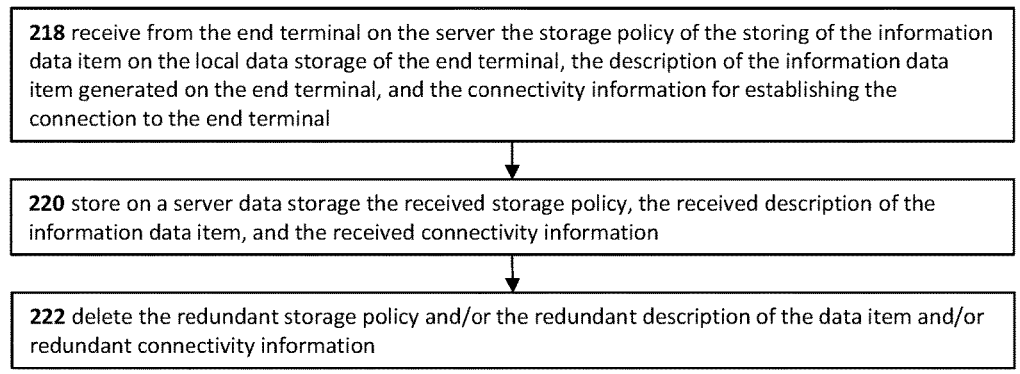
FIG. 5 is a block diagram of a process.

FIG. 5 depicts a sequence of process blocks 218, 220, and 222, which can be executed on the server in response to receiving in process block 218 the following information from the end terminal: a storage policy of the storing of the information data item on the local data storage of the end terminal, a description of the information data item generated on the end terminal, and a connectivity information for establishing a connection to the end terminal. Process block 218 can be executed multiple times, because various end terminals can generate various information items. Process block 220 is executed after process block 218. In process block 220 the information received in process block 218 is stored on a server data storage 123. Process block 220 is repeated multiple times as well, e.g. after each execution of process block 220. Process block 222 is executed after any of process blocks 218 and 220 or concurrently with then. In process block 222 the server data storage is maintained in a way that only actual information is stored thereon. For instance, when a storage policy indicates that a period availability of an information data item on a local data storage of one of the end terminals is elapsed, a description of this information data item is deleted together with its storage policy from the server data storage. When there are no descriptions of the information data items stored on a local data storage of one of the end terminals stored on the server data storage, then connectivity information for establishing a connection the one of the end terminals is deleted from the server data storage.

Figure 6:
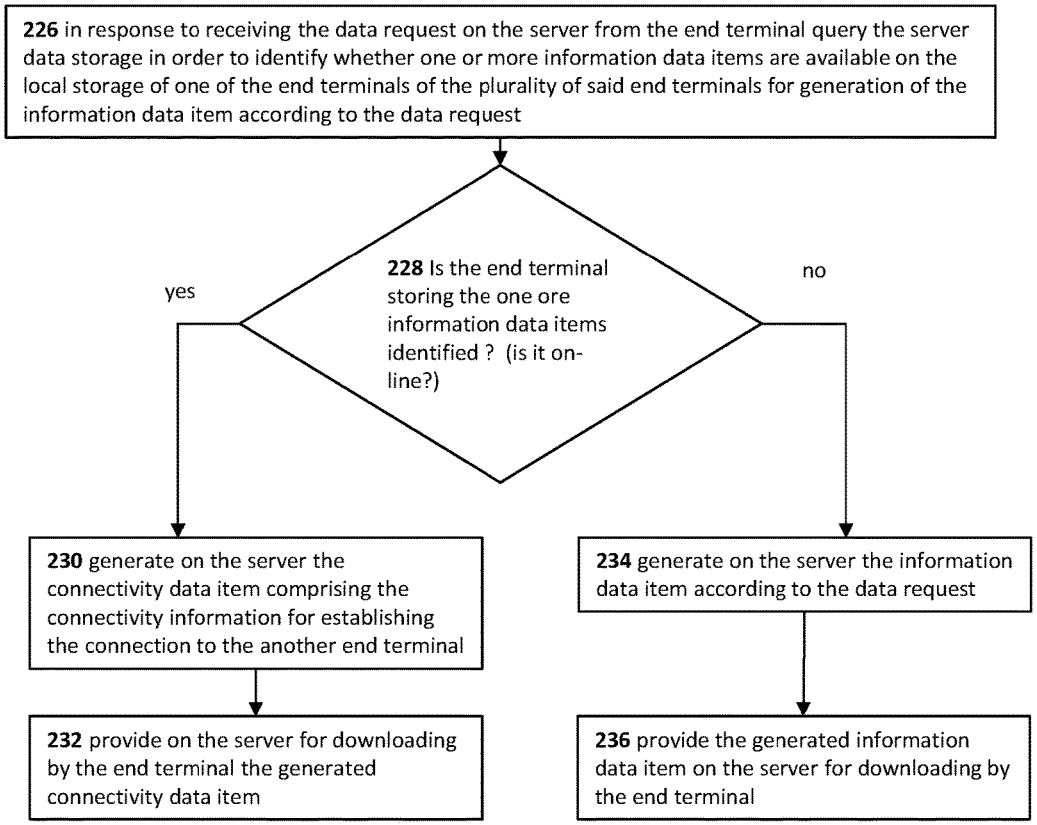
FIG. 6 is a block diagram of a process.

FIG. 6 depicts in greater details a part of the method executed on the server 120 after the server receives a data request in process block 202. In process block 226 the server performs a query in the server data storage in order to identify whether one or more information data items are available on a local data storage of one of the end terminals for the generation of the information data item according to the data request. The query for identification of the one of the end terminals can be formulated such that it checks not only for the presence on the local data storages of the one or more information data items required for the generation of the information data item but whether the generation of the information data item complies with the storage policies of the one or more information data items as well. For instance the data request can be formulated as a data request to download several music files of specific artists. In response to this data request the server perform a query in the server data storage in order to find descriptions of information data items indicating that albums of specific artists comprising the required music files are stored on a local data storage of one of the end terminals. The query can comprise another constraint regarding storage policies of the albums, wherein the storage policies are examined in relation to the generation of the information data item. For instance when there is only one music file from an album is needed for the generation of the information data item according to the request, then the storage policy of this album has to include information that extraction of one music file out of the album can be done. When the storage policy states that extraction of the music file is not allowed then the query has to be programmed such that the album comprising the music file which cannot be extracted according to the storage policy is not selected.

The query performed in process block 226 can be limited to information data items downloaded to or generated on the end terminals within a predefined interval of time. The predefined interval of time has a starting time and an end time. The end time can be the time when execution of process block 226 is started. Alternatively, the end time can be selected before the time when execution of process block 226 is started.

In decision process block 228 executed after process block 226 the results of the query are evaluated. When such end terminal (for instance the another end terminal mentioned above) having the one or more data items stored on its local data storage is identified, then decision process block causes execution of process block 230, otherwise decision process block causes execution of process block 234.

Decision process block 228 can comprise additional criterion, i.e. verification of whether the one of the end terminals identified as a result of the query in process block 226 is in on-line state, because when it is in off-line state it cannot generate the information data item in response to receiving the data request from the end terminal. When it is off-line than decision process block can cause repetition of process block 226 in order to identify the end terminal which is on-line and its local data storage stores the one or more information data items for generation of the information data item according to the data request, alternatively the decision block can cause execution of process block 234 without repetitive query.

When additional end terminal-server connection between the another end terminal and the server is established using an instant messaging computer network protocol or an encrypted instant messaging computer network protocol another functionality of the this protocol can be employed, i.e. control of the state of the another end terminal (off-line or on-line).

In process block 230 the server generates a connectivity data item comprising connectivity information for establishing the connection to the end terminal identified in process block 226. The connectivity information is retrieved from the server data storage. The connectivity information can be encrypted using an encryption key. The encryption key can be sent via the additional end terminal-server connection 132 between the server 120 and the end terminal 100 from the server 120 to the end terminal. When the connectivity information is encrypted using the encryption key the establishing of the end terminal-server connection between the end terminal and the another end terminal in process block 208*a* using the connectivity information comprised in the connectivity data item comprises decrypting of the encrypted connectivity information comprised in the connectivity data item using the encryption key received on the end terminal from the server via the additional end terminal-server connection 132.

Process block 232 is executed after process block 230. In process block 232 the generated connectivity data item is provided on the server for downloading, which can be performed in process block 206*b*2.

In process block 234 the server generates the information data item according to the data request. The generation of the information data item can be performed using information data items stored on the server. Alternatively or in addition the server can be integrated in a cloud infrastructure and communicate via it with other servers and/or databases in order to receive from them one or more information data items for the generation of the information data item according to the data request. As another option the server can already store the information data item which complies with the data request. Turning back to the example when according to the data request the several music files of the specific artists have to be downloaded the server can find an information data item matching the data request, i.e. a mix album having the music files of the specific artists. In this case the generation of the information data item is reduced to querying of one or more databases to which the server has access. Similar situation can occur on the anther end terminal when its local data storage stores the information data item complying with the data request.

Process block 236 is executed after process block 234. In process block 236 the information data item generated on the server according to the data request is provided for download on the server. Process block 236 can be executed in process block 206*b*1.

Figure 7:
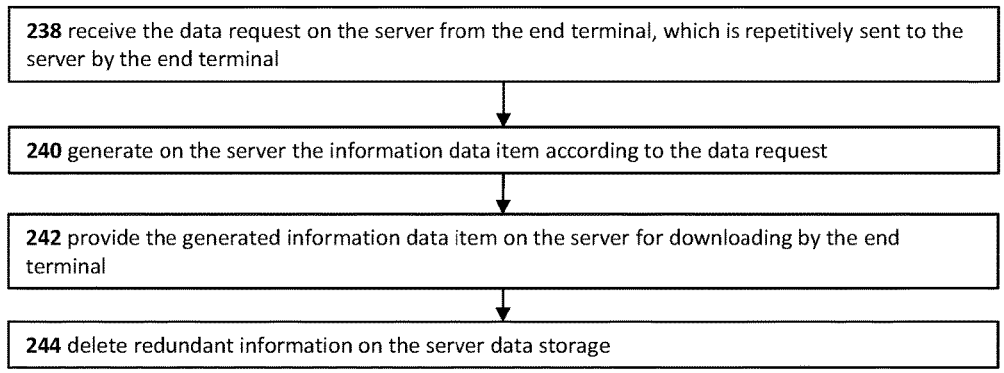
FIG. 7 is a block diagram of a process.

FIG. 7 depicts a fragment of the method executed on the server when the end terminal-end terminal connection failed in process step 208*a* or the processing of the data request failed (process steps 208*b*1-3). The end terminal which has downloaded previously the connectivity data item for establishing the end terminal-end terminal connection to the another end terminal sends the same data request to the server. This data request is received on the server in process block 238. The data request can comprise a special marker or flag indicating that this is data request sent repetitively to the server because of the failure to establish the end terminal-end terminal connection to the another end terminal or because of the failure to process the data request (process steps 208*b*1-3). Alternatively the server can register the identification of the end terminal which has already sent this data request and the respective connectivity data item which was provided for downloading in response to the receiving the of the previously received data request and by analyzing this information identify whether the data request is sent for the second time.

Process block 240 is executed after process block 238. Process block 240 is the same as process block 234.

Process block 242 is executed after process block 240. Process block 242 is the same as process block 236.

Process block 244 is executed after process block 244. In process block information related to the another terminal stored on the server data storage is deleted. This information comprises at least descriptions of the one or more information data items stored on the local data storage of the anther terminal for the generation of the information data items and storage policies of the one or more information data items stored on the local data storage of the another end terminal. The information deleted from the sever data storage can further comprise descriptions of one or more other data items stored on the local data storage of the another end terminal, their storage policies, and connectivity information for establishing connection to the anther end terminal.

Figure 8:
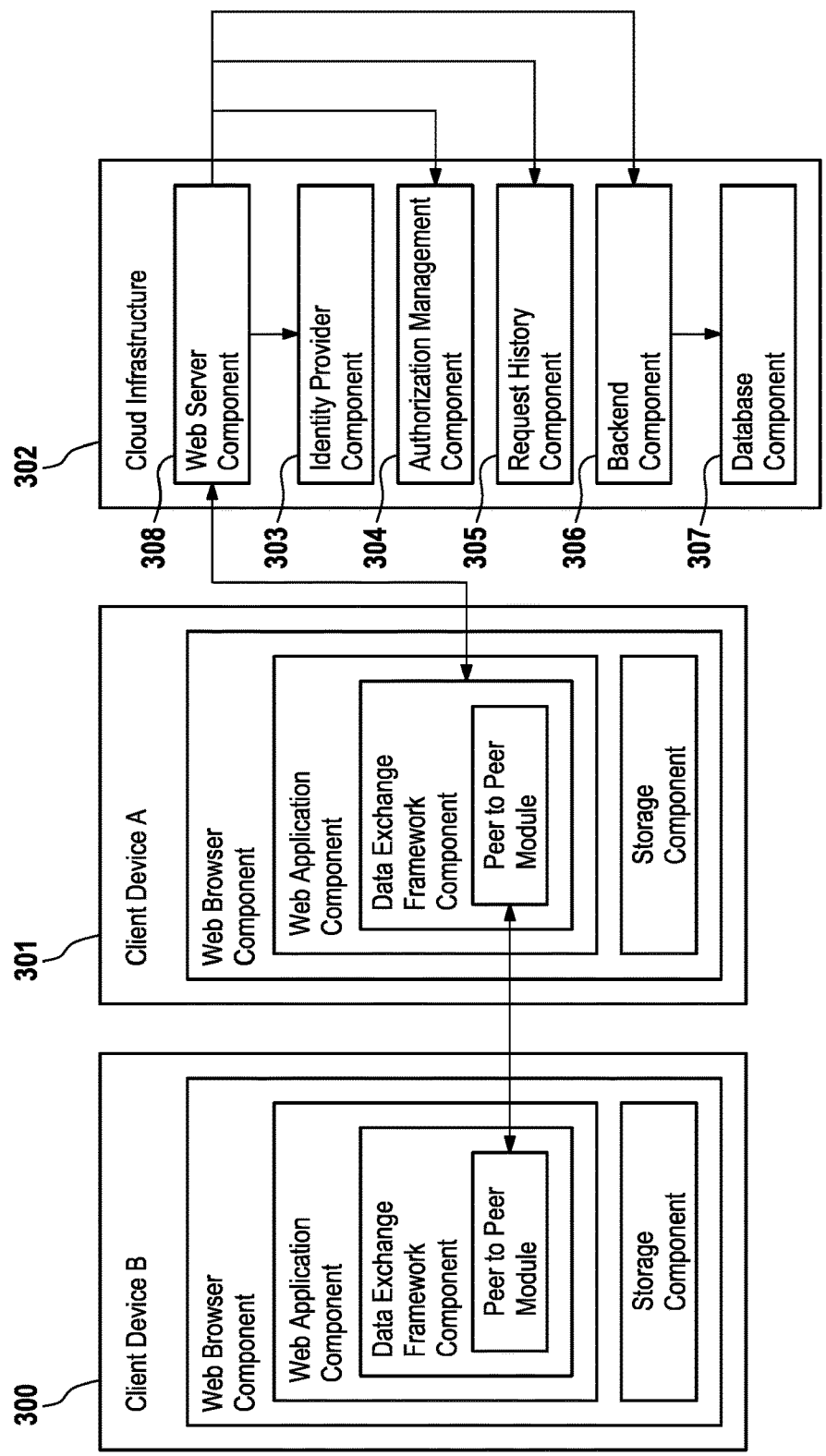
FIG. 8 is a block diagram illustrating computer systems.

FIG. 8 depicts another configuration of computer systems suitable for execution of the method described above. A cloud infrastructure 302 comprises a web server component (or a webserver) 308, an identity provider component 303, and authorization management component 304, a request history component 305, a back end component 306 configured to operate a database component 307. Several end terminals 300 and 301 are connected to the web server component 308 via one or more computer networks. The end terminals 300 and 301 comprise a respective microprocessor and a respective memory (not depicted on the drawing). The memories store computer commands executable by the processors, which when executed by the processors cause the end terminals to execute the method. The computer commands operate web browsers installed on the end terminals. The web browsers comprise each the respective data exchange framework component, wherein the data exchange framework component, comprises a peer to peer module for communication between the end terminals. The end terminals comprise each a respective data storage component (or a local data storage).

Figure 9:
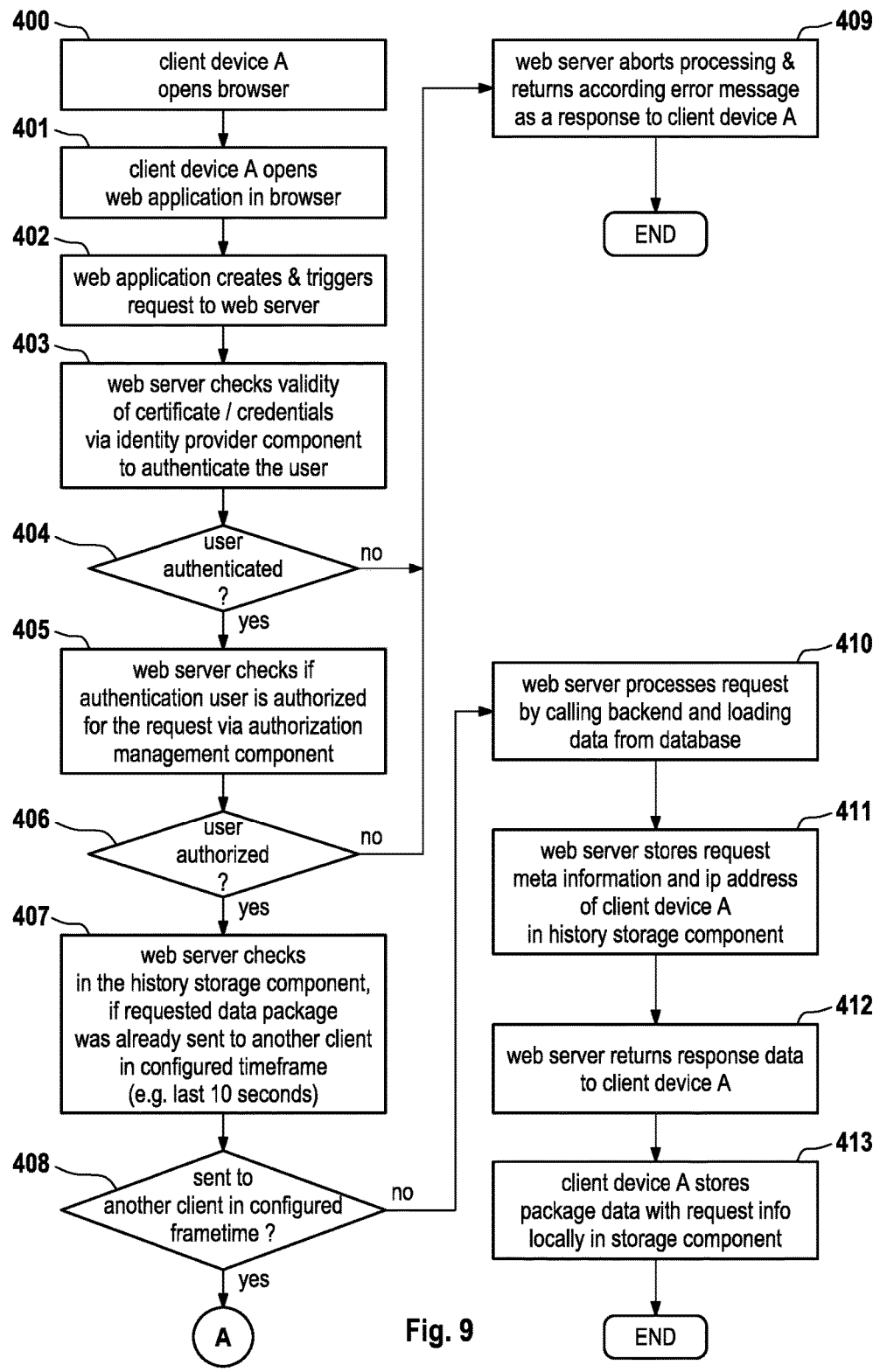
FIG. 9 is a block diagram of a process.
Figure 10:
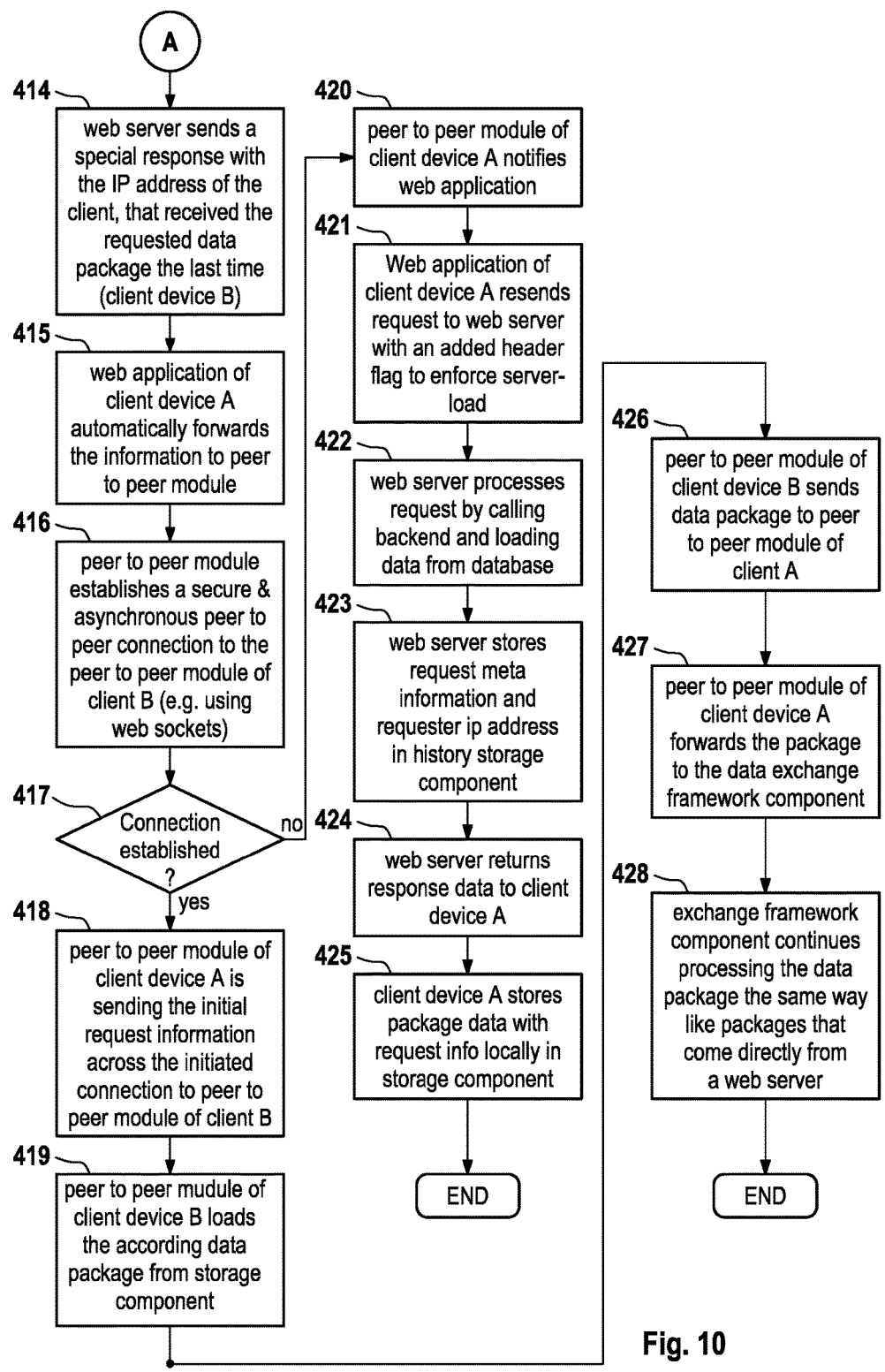
FIG. 10 is a block diagram of a process.

FIGS. 9 and 10 depict a flow chart of a computer-implemented method which is based on the same process blocks as the computer-implemented method described above.

The method begins with process block 400, wherein the computer commands executed by the microprocessor of the end terminal 301 start/open a web browser. In process block 401 executed after process block 400 the computer commands executed by the microprocessor start/open a web application in the web browser running on the end terminal 301. In process block 402 executed after process block 402 the web application creates a data request to the web server component 308. In process block 403 executed after the process block 402 the web server validates certificate and/or credentials provided by the end terminal 301 via identity provider component 303 to authenticate the end terminal 301 or a user if the user operates the end terminal 301.

Decision process block 404 executed after process block 403 causes execution of process block 409 if the terminal or user are not authenticated, otherwise it causes execution of process block 405. In process block 409 the web server component 308 aborts processing of the data request and returns an error message as a response to the end terminal 301. The method is stopped after execution of process block 409.

In process block 405 the web server component 308 checks whether authenticated end terminal 301 or its user are authorized for the data request via the authorization management component 405. Decision process block 406 causes execution of process block 409 if the end terminal 301 or the user are not authorized, otherwise it causes execution of process block 407. In process block 407 web server checks in the request history component whether an information data item to be downloaded from the server according to the data request is already downloaded by any other end terminal 300. Another additional validation criterion in process block 407 is time interval elapsed since execution of process block 407. In the other words only a history of data requests being not older than a predefined time interval is searched in process block 407.

Decision process block 408 is executed after process block 407. Decision process block 408 causes execution of process block 414 when the information data item was downloaded by the any other end terminal 300, otherwise it causes execution of process block 410. Additional criterion regarding the downloading within the predefined interval of time of the information data item by the any other end terminal 300 in response to the respective data request of the any other end terminal received by the web server component 308 can be applied. When additional criterion is not fulfilled decision process block 408 causes execution of process block 410, otherwise it causes execution of process block 414.

In process block 410 the web server component 308 processes the data request by calling the backend component 306 and loading from the database component 307 the information data item corresponding to the data request. In process block 411 executed after process block 410 the web server component 308 stores internet address of the end terminal 301 (e.g. its IP address) and the data request on the request history component 305. A descriptive metadata of the data request can be stored instead of the data request. In process block 412 executed after process block 411 the web server component 308 returns the information data item to the end terminal 301. In process block 413 executed after process block 412 the end terminal 413 stores the information data item on it local data storage and as option an information describing the data request.

In process block 414 the web server component sends a response message to the end terminal comprising internet address (e.g. IP address) of the end terminal which received the requested information data item for the last time according to the records in the request history component.

In process block 415 executed after process block 414 the web browser component of the end terminal 301 which has received the response message automatically forwards the response message to the peer to peer module of the end terminal 101.

In process block 416 executed after process block 415. The peer to peer module of the end terminal 301 establishes a secure and asynchronous connection to a peer to peer module of the end terminal 300 which internet address is specified in the response message.

Decision process block 417 executed after process block 416 causes execution of process block 418 when the connection is successfully established otherwise it cases execution of process block 420.

In process block 420 peer to peer module of the end terminal 301 notifies the web application component of the end terminal 301 that the establishing of the connection has failed.

In process block 421 executed after process block 422 web application component of the end terminal resends the data request to the web server component 308. The resent data request comprises a header flag to enforce the server load. In process block 422 the processes the resent data request by calling the backend component 306 and loading from the database component 307 the information data item corresponding to the data request. In process block 423 executed after process block 422 the web server component 308 stores internet address of the end terminal 301 (e.g. its IP address) and the data request on the request history component 305. A descriptive metadata of the data request can be stored instead of the data request. In process block 424 executed after process block 423 the web server component 308 returns the information data item to the end terminal 301. In process block 425 executed after process block 424 the end terminal 413 stores the information data item on it local data storage and as option an information describing the data request.

In process block 418 the peer to peer module of the end terminal 301 sends the initial data request which was already sent to the web server component in process block 402 to the peer to peer module of the end terminal 300. In process block 419 executed after process block 418 the peer to peer module of the end terminal 300 retrieves the information data item corresponding to the data request from its storage component. In process block 426 executed after process block 419 the peer to peer module of the end terminal 300 sends the retrieved information data item to the peer to peer module of the end terminal 301. In process block 427 executed after the process block 426 the peer to peer module of the end terminal 301 forwards the package to the data exchange framework component of the end terminal 301. In process block 428 executed after process block 427 the exchange framework component of the end terminal 301 constitutes processing the information data item in the same way like data items which are received directly from the web server component 308.

The structuring of the web application component on the end terminal 300, 301 in a multi-tire structure comprising data exchange framework component and peer-to-peer module can be advantageous because it can reduce vulnerabilities of the end terminal by assigning specific application functionalities such as communication between the end terminals 300, 301 and communication between the end terminal 300, 3001 and the web server component 308 to different tires.

According to another embodiment, the present invention relates to a computer readable medium having stored thereon a computer executable code for execution by a processing unit (e.g. one or more computer microprocessors) controlling a server, wherein execution of the instructions of the executable code causes the processing units to execute a computer-implemented method of any of the aforementioned embodiments.

According to another embodiment, the present invention relates to a computer readable medium having stored thereon a computer executable code for execution by one or more processing units (e.g. one or more computer microprocessors) controlling one or more end terminals, wherein execution of the instructions of the executable code causes the one or more processing units to execute a computer-implemented method of any of the aforementioned embodiments.

The invention claimed is:

1. A computer-implemented method of distributed data processing comprising:
   establishing a first end terminal-server connection between a first end terminal and a server;
   sending a data request from the first end terminal to the server via the established first end terminal-server connection;
   terminating the established first end terminal-server connection after the sending the data request from the first end terminal to the server;
   reestablishing, by the server, the first end terminal-server connection;
   first downloading, from the server to the first end terminal via the reestablished first end terminal-server connection, a connectivity data item generated by the server in response to receiving the data request when a first information data item can be generated according to the data request by a second end terminal using one or more information data items stored on a local data storage of the second end terminal, the connectivity data item including first connectivity information for establishing a connection to the second end terminal;

terminating the reestablished first end terminal-server connection after the first downloading;

establishing an end terminal-end terminal connection between the first end terminal and the second end terminal using the first connectivity information in response to the first downloading;

processing, by the second end terminal, the data request by,
- second sending the data request from the first end terminal to the second end terminal via the established end terminal-end terminal connection,
- controlling, by the first end terminal, the second end terminal to generate the first information data item according to the data request via the established end terminal-end terminal connection by,
  - sending a maximum time interval for the generation of the first information data item to the second end terminal,
  - reconfiguring the second end terminal to make it operable for the generation of the first information data item according to the data request within the maximum time interval, and
  - generating, by the second end terminal, the first information data item according the data request using the one or more information data items stored on the local data storage of the second end terminal, and
- second downloading from the second end terminal to the first end terminal the generated first information data item via the established end terminal-end terminal connection; and terminating the established end terminal-end terminal connection after the second downloading.

2. The computer-implemented method of claim 1, further comprising:

third downloading, from the server to the first end terminal via the reestablished first end terminal-server connection, the first information data item generated by the server according to the data request when the first information data item cannot be generated by the second end terminal according to the data request using the one or more information data items stored on the local data storage of the second end terminal, the generated first information data item having a bigger data volume than the connectivity data item.

3. The computer-implemented method of claim 2, further comprising:

generating a further data request by processing a content of the first information data item by the first end terminal in response to the second downloading or the third downloading;

establishing a second end terminal-server connection between the first end terminal and the server;

sending the further data request from the first end terminal to the server via the established second end terminal-server connection;

terminating the established second end terminal-server connection after the sending the further data request;

reestablishing the second end terminal-server connection;

fourth downloading, from the server to the first end terminal via the reestablished second end terminal-server connection, at least one of the following data items generated by the server in response to receiving the further data request,
- a second information data item generated by the server according to the further data request, or
- another connectivity data item including second connectivity information for establishing a connection to another end terminal, the second information data item having a smaller data volume than the other connectivity data item;

terminating the reestablished second end terminal-server connection after the fourth downloading; and executing the following when establishing another end terminal-end terminal connection using the other connectivity data item, or processing of the data request by the second end terminal after the establishing the other end terminal-end terminal connection, fails,
- establishing a third end terminal-server connection between the first end terminal and the server,
- repeating the sending the further data request from the first end terminal to the server,
- terminating the established third end terminal-server connection after the repeating,
- reestablishing the third end terminal-server connection,
- fifth downloading, from the server to the first end terminal via the reestablished third end terminal-server connection, the second information data item generated by the server according to the further data request based on the repeating, and
- terminating the reestablished third end terminal-server connection after the fifth downloading.

4. The computer-implemented method of claim 3, wherein the server is configured to process data requests repeatedly sent to the server in response to failure of,
- establishing a respective end terminal-end terminal connection, or
- processing a respective data request, with higher priority than data requests sent to the server for a first time.

5. The computer-implemented method of claim 1, wherein each of the one or more information data items stored on the local data storage of the second end terminal is either,
- generated by the second end terminal, or
- downloaded from the server or a third end terminal.

6. The computer-implemented method of claim 1, wherein the establishing the first end terminal-server connection is initiated by the first end terminal and the reestablishing the first end terminal-server connection is initiated by the server, the establishing the first end terminal-server connection and the reestablishing the first end terminal-server connection being performed using an asynchronous request-response client-server computer network protocol.

7. The computer-implemented method of claim 1, wherein the establishing the end terminal-end terminal connection is performed using a computer network protocol supporting generation of one or more sockets by the first end terminal and the second end terminal for performing the second downloading.

8. The computer-implemented method of claim 1, further comprising:

generating by the first end terminal a second information data item using one or more information data items stored on a local data storage of the first end terminal, wherein each of the one or more information data items stored on the local data storage of the first end terminal is either,
- generated by the first end terminal, or downloaded from the server, the second end terminal, or a third end terminal;

storing the second information data item generated by the first end terminal the local data storage of the first end terminal; and sending, from the first end terminal to the server,
a first storage policy associated with the information data item on the local data storage of the first end terminal,
a first description of the generated second information data item, and
second connectivity information for establishing a connection to the first end terminal.

9. The computer-implemented method of claim 8, wherein the sending, from the first end terminal to the server, the first storage policy, the first description and the second connectivity information is executed using a second end terminal-server connection between the server and the first end terminal established using one of the following protocols,
instant messaging computer network protocol,
encrypted instant messaging computer network protocol, or
cryptographic computer network protocol.

10. The computer-implemented method of claim 9, wherein,
the first connectivity information is encrypted by an encryption key,
the establishing of the end terminal-end terminal connection includes decrypting the encrypted first connectivity information using the encryption key, and
the computer-implemented method further comprises:
sending the encryption key to the first end terminal via the second end terminal-server connection.

11. The computer-implemented method of claim 8, further comprising:
receiving, by the server from the first end terminal, the first storage policy, the first description, and the second connectivity information;
storing, on a server data storage, the received first storage policy, the received first description, and the received second connectivity information, the server data storage storing,
a plurality of storage policies associated with information data items on local data storages of a plurality of end terminals,
a plurality of descriptions of the information data items stored on the local data storages of the plurality of end terminals, and
additional connectivity information for establishing respective connections to each of the plurality of end terminals;
deleting, from the server data storage, a particular storage policy of the plurality of storage policies and a particular description of the plurality of descriptions, the particular description being of a third information data item with which the particular storage policy is associated, if,
the particular storage policy indicates that the third information data item is no longer available on the local data storage of a respective end terminal of the plurality of end terminals, or
the particular description is stored on the server data storage longer than a defined time interval;
querying the server data storage in response to receiving, by the server from the first end terminal, another data request to identify whether one or more information data items are available on a local data storage of one of the plurality of end terminals for generation of a fourth information data item according to the other data request,
first executing, when the one or more information data items are available on the local data storage of the one of the plurality of end terminals for the generation of the fourth information data item according to the other data request, the following,
generating, by the server, another connectivity data item including third connectivity information for establishing a connection to the one of the plurality of end terminals, and
providing, by the server, the generated other connectivity data item for downloading by the first end terminal;
second executing, when the one or more information data items are not available on the local data storage of the one of the plurality of end terminals for the generation of the fourth information data item according to the other data request, the following,
generating, by the server, the fourth information data item according to the other data request, and
providing, by the server, the generated fourth information data item for downloading by the first end terminal;
third executing, in response to receiving the other data request on the server from the first end terminal, the other data request being repeatedly sent to the server by the first end terminal, the following,
generating, by the server, the fourth information data item according to the other data request;
providing, by the server, the generated fourth information data item for downloading by the first end terminal; and
deleting the following information from the server data storage,
one or more descriptions of the one or more information data items stored on the local data storage of the second end terminal, and
one or more storage policies of the one or more information data items stored on the local data storage of the second end terminal.

12. The computer-implemented method of claim 11, further comprising:
performing the first executing when the one of the plurality of end terminals is in an online state; and
sending, by the first end terminal to the server via a second end terminal-server connection, after the downloading of the first information data item on the first end terminal either from the server or from the second end terminal, when the first information data item is downloaded correctly and stored on the local data storage of the first end terminal, the following,
a second storage policy of the storing of the downloaded first information data item on the local data storage of the first end terminal,
a second description of the downloaded first information data item, and
fourth connectivity information for establishing a connection to the first end terminal.

13. A server, comprising:
at least one processor;
a server data storage; and a memory, the memory storing a computer executable code, the computer executable code when executed by the at least one processor causing the server to,
store, on the server data storage,
a plurality of storage policies associated with information data items on local data storages of a plurality of end terminals,
connectivity information for establishing respective connections to each of the end terminals of the plurality of end terminals, and
a plurality of descriptions of the information data items stored on the local data storages,
establish a first end terminal-server connection between the server and a first end terminal of the plurality of end terminals,
receive a data request from the first end terminal via the established first end terminal-server connection,
terminate the established first end terminal-server connection after receiving the data request,
query the server data storage to identify whether one or more information data items are available on a local data storage of a second end terminal of the plurality of end terminals for generation of a requested information data item according to the data request, according to respective storage policies of the plurality of storage policies associated with the one or more information data items,
generate a connectivity data item including connectivity information for establishing an end terminal-end terminal connection to the second end terminal when the one or more information data items are identified as available on the local data storage of a second end terminal of the plurality of end terminals,
reestablish the first end terminal-server connection,
send the connectivity data item to the first end terminal via the reestablished first end terminal-server connection,
terminate the reestablished first end terminal-server connection after the connectivity data item is sent,
establish a second end terminal-server connection between the first end terminal and the server,
receive the data request from the first end terminal via the established second end terminal-server connection for the second time,
terminate the established second end terminal-server connection after the data request is received for the second time,
generate the requested information data item according to the data request received for the second time,
reestablish the second end terminal-server connection,
send to the first end terminal via the reestablished second end terminal-server connection the requested information data item generated by the server according to the data request received for the second time, and
terminate the reestablished second end terminal-server connection after the requested information data item is sent to the first end terminal,
wherein the server is configured to process data requests repeatedly sent to the server with higher priority than data requests sent to the server for the first time, the first end terminal is configured to send the data request for the second time to the server in response to failure of,
establishing a respective end terminal-end terminal connection using a respective connectivity data item downloaded from the server, or
generating, by the second end terminal, the requested information data item within a maximum time interval.

14. The server of claim 13, wherein the computer executable code, when executed by the at least one processor, further causes the server to,
generate the requested information data item according to the data request when the one or more information data items are not identified as available on the local data storage of the second end terminal; and
send to the first end terminal via the reestablished first end terminal-server connection the generated requested information data item,
wherein the requested information data item has a bigger data volume than the connectivity data item.

15. A first end terminal, comprising:
at least one processor; and
a memory, the memory storing a computer executable code, the computer executable code, when executed by the at least one processor causing the first end terminal to,
establish an end terminal-server connection between the first end terminal and a server,
send a data request to the server,
terminate the established end terminal-server connection after the data request is sent,
reestablish the end terminal-server connection,
download a connectivity data item from the server via the reestablished end terminal-server connection when a requested information data item can be generated on a second end terminal using one or more information data items stored on a local data storage of the second end terminal according to the data request, the connectivity data item being generated by the server in response to receiving the data request, the connectivity data item including connectivity information for establishing a connection to the second end terminal,
terminate the reestablished end terminal-server connection after the connectivity data item is downloaded,
establish an end terminal-end terminal connection between the first end terminal and the second end terminal using the connectivity information in response to downloading the connectivity data item,
process the data request on the second end terminal by,
sending the data request to the second end terminal via the established end terminal-end terminal connection,
causing the second end terminal to generate the requested information data item according to the data request via the established end terminal-end terminal connection, the second end terminal generating the requested information data item using the one or more information data items stored on the local data storage of the second end terminal, and
downloading the generated requested information data item from the second end terminal via the established end terminal-end terminal connection, and
terminate the established end terminal-end terminal connection after the downloading the generated requested information data item, wherein the causing includes,
sending a maximum time interval for the generation of the requested information data item to the second end terminal, and reconfiguring the second end terminal to make it operable for the generation of the requested information data item according to the data request within the maximum time interval.

16. The first end terminal of claim 15, wherein the computer executable code, when executed by the at least one processor, further causes the first end terminal to:

download the requested information data item from the server via the reestablished end terminal-server connection when the requested information data item cannot be generated on the second end terminal using the one or more information data items stored on the local data storage of the second end terminal according to the data request, the requested information data item having a bigger data volume than the connectivity data item.

* * * * *